United States Patent
Wang et al.

(10) Patent No.: US 9,904,641 B2
(45) Date of Patent: Feb. 27, 2018

(54) POWER CONTROL DEVICE AND METHOD

(71) Applicant: HON HAI PRECISION INDUSTRY CO., LTD., New Taipei (TW)

(72) Inventors: Chia-Peng Wang, New Taipei (TW); Yu-Shiuan Tsao, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 247 days.

(21) Appl. No.: 14/871,110

(22) Filed: Sep. 30, 2015

(65) Prior Publication Data

US 2017/0090549 A1    Mar. 30, 2017

(30) Foreign Application Priority Data

Sep. 25, 2015  (TW) .................................. 104131960

(51) Int. Cl.
| | | |
|---|---|---|
| *G06F 1/00* | (2006.01) | |
| *G06F 13/40* | (2006.01) | |
| *G06F 1/26* | (2006.01) | |
| *H01H 9/56* | (2006.01) | |
| *H02J 9/06* | (2006.01) | |
| *H01H 47/18* | (2006.01) | |

(52) U.S. Cl.
CPC .......... *G06F 13/4022* (2013.01); *G06F 1/263* (2013.01); *H01H 9/56* (2013.01); *H02J 9/061* (2013.01); *H01H 47/18* (2013.01); *H01H 2300/018* (2013.01)

(58) Field of Classification Search
None
See application file for complete search history.

(56) References Cited

U.S. PATENT DOCUMENTS

| | | | |
|---|---|---|---|
| 2004/0076148 A1* | 4/2004 | Ferry ........................ | H02J 9/06 370/389 |
| 2008/0054878 A1* | 3/2008 | Satoh ........................ | H02J 3/38 324/76.11 |
| 2008/0174181 A1* | 7/2008 | Kuo .......................... | H02J 9/06 307/80 |
| 2014/0183956 A1* | 7/2014 | Wang ....................... | H02J 9/062 307/64 |
| 2014/0254050 A1* | 9/2014 | Haines .................... | G01R 31/3277 361/42 |

* cited by examiner

*Primary Examiner* — Nitin C Patel
(74) *Attorney, Agent, or Firm* — ScienBiziP, P.C.

(57) ABSTRACT

A switch control device includes a switch device and a control device. The switch device includes first and second input terminals, an output terminal, a processor, and a plurality of delays. The processor is configured to detect period of an input voltage from the first input terminal, and to determine whether the input voltage is normal. A delay time can be computed by the processor, according to the period of the input voltage and a release time of the each delay. If the input voltage from the first input terminal is abnormal, the processor detects a zero voltage crossing signal or a peak of voltage signal, and delays the zero voltage crossover signal or the peak of voltage signal for a delay time, to control the delays coupled to the first input terminal to turn off. Therefore, an arc discharge resulted by the relay can be avoid or reduce.

11 Claims, 11 Drawing Sheets

POWER CONTROL DEVICE AND METHOD

FIELD

The subject matter herein generally relates to a switch control device and method for power.

BACKGROUND

An automatic transfer switch (ATS) usually switches power to an output from a first power source to a second power source, through turn off a plurality of relays which are coupled to the first power source, and turn on a plurality of relays coupled to the second power source. However, when the plurality of relays which are coupled to the first power source are turned off instantly, arc discharge will be occurred, which will not only lead to the first and second power source short circuited, but also lead to the relays are damaged.

BRIEF DESCRIPTION OF THE DRAWINGS

Implementations of the present technology will now be described, by way of example only, with reference to the attached figures.

DETAILED DESCRIPTION

Figure 1:
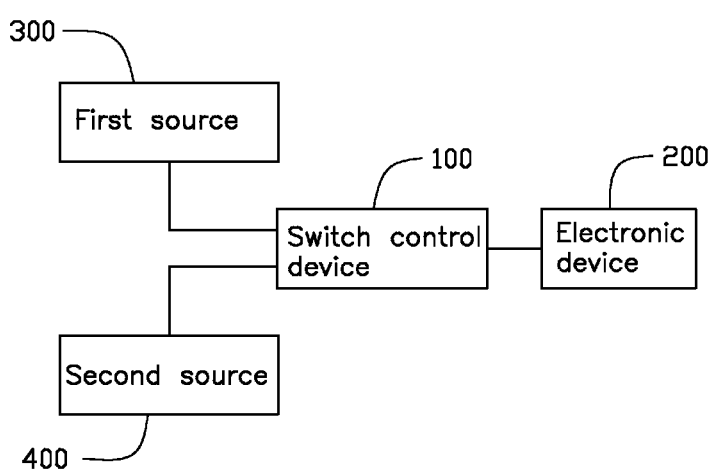
FIG. 1 is a block diagram of an embodiment of an switch control device coupled to a first power source, a second power source, and an electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently coupled or releasably coupled. The term "comprising," when utilized, means "including, but not necessarily limited to"; it specifically indicates open-ended inclusion or membership in the so-described combination, group, series and the like.

The disclosure will now be described in relation to an electronic device with a switch control device for power.

FIG. 1 illustrates a schematic diagram of an embodiment of an switch control device 100 coupled to a first power source 300, a second power source 400, and an electronic device 200. The switch control device 100 is configured to switch between the first power source 300 and the second power source 400, to supply voltage from the first power source 300 or the second power source 400 to the electronic device 200.

Figure 2:
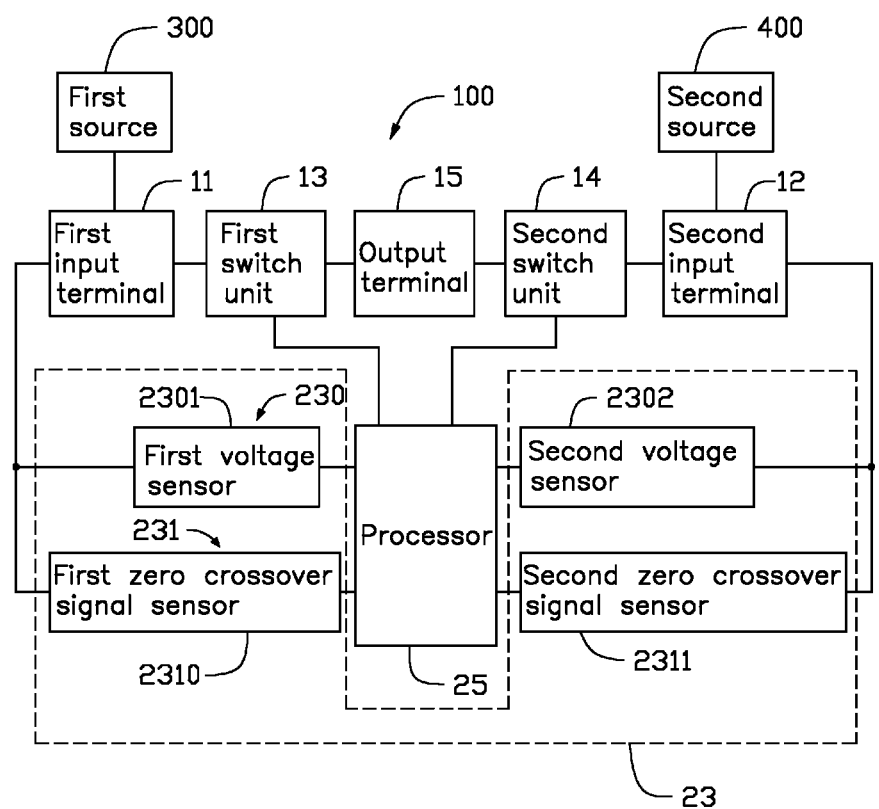
FIG. 2 is a block diagram of a first embodiment of the switch control device of FIG. 1.

FIG. 2 illustrates a block diagram of a first embodiment of the switch control device 100 of FIG. 1. The switch control device 100 includes a switch device 10 and a control device 20. In at least one embodiment, the switch device 10 is an automatic transfer switch. The switch device 10 includes a first input terminal 11, a second input terminal 12, a first switch unit 13, a second switch unit 14, and an output terminal 15. The first input terminal 11 and the second input terminal 12 are coupled to the first power source 300 and the second power source 400 respectively. The output terminal 15 receives a first input voltage from the first power source 300 through the first input terminal 11, or receives a second input voltage from the second power source 400 through the second input terminal 12. The control device 20 includes a detection unit 23 and a processor 25. The detection unit 23 includes a voltage sensor 230 and a zero crossover signal sensor 231. The voltage sensor 230 includes a first voltage sensor 2301 and a second voltage sensor 2302. The zero crossover signal sensor 231 includes a first zero crossover signal sensor 2310 and a second zero crossover signal sensor 2312. The first zero crossover signal sensor 2310 and a second zero crossover signal sensor 2311 and the first zero crossover signal sensor 2310 are coupled to the first input terminal 11 and the processor 25. The second voltage sensor 2302 and the second zero crossover signal sensor 2311 are coupled to the second input terminal 12 and the processor 25. The processor 25 are coupled to the first switch unit 13 and the second switch unit 14.

Figure 3:
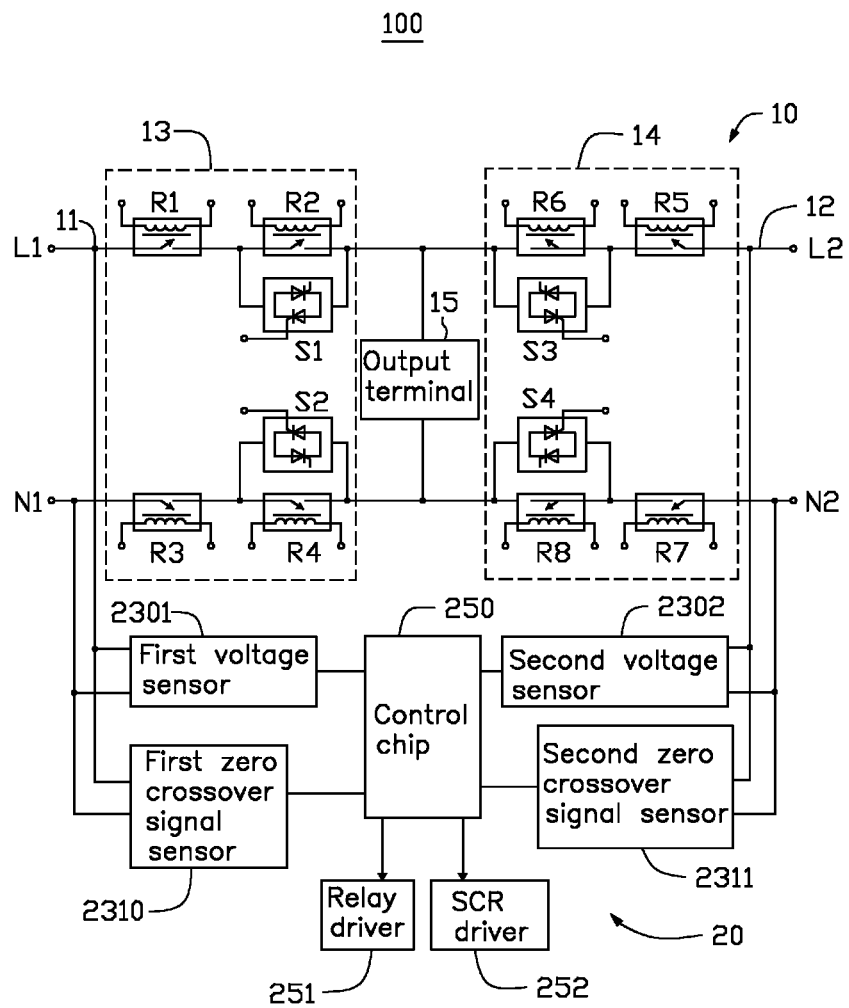
FIG. 3 is a circuit diagram of the first embodiment of the switch control device of FIG. 1, wherein the switch control device may receive an input voltage, and comprise at least one relay.

FIG. 3 illustrates a circuit diagram of the first embodiment of the switch control device 100 of FIG. 1. Both of the first input terminal 11 and the second input terminal 12 are coupled to the a municipal electric power. The first switch unit 13 includes four relays R1, R2, R3, and R4 and two silicon controlled rectifiers (SCRs) S1 and S2. The second switch unit 14 includes four relays R5, R6, R7, and R8 and two silicon controlled rectifiers (SCRs) S3 and S4. The relays R1 and R2 are coupled in series, and are coupled between a live wire L1 of the municipal electric power and the output terminal 15. The relays R3 and R4 are coupled in series, and are coupled between a neutral wire N1 of the municipal electric power and the output terminal 15. Each of the SCR is composed of two single thyristors coupled in parallel. A first terminal of the SCR S1 is coupled to a node between the relay R1 and the relay R2. A second terminal of the SCR S1 is coupled to the output terminal 15. A second terminal of the SCR S2 is coupled to a node between the relay R3 and the relay R4. A second terminal of the SCR S2 is coupled to the output terminal 15. The relays R5 and R6 are coupled in series, and are coupled between a live wire L2 of the municipal electric power and the output terminal 15. The relays R7 and R8 are coupled in series, and are coupled between a neutral wire N2 of the municipal electric power and the output terminal 15. A first terminal of the SCR S3 is coupled to a node between the relays R5 and R6. A second terminal of the SCR S3 is coupled to the output terminal 15. A first terminal of the SCR S4 is coupled to the node between the relays R7 and R8. A second terminal of the SCR S4 is coupled to the output terminal 15.

The processor 25 includes a control chip 250, a relay driver 251, and a SCR driver 252. Each of the relays R1, R2, R3, R4, R5, R6, R7, and R8 is coupled to the processor 25 through the relay driver 251. Each control terminal of the SCR S1, S2, S3, and S4 is coupled to the processor 25 through the SCR driver 252. The relay driver 251 and the SCR driver 252 can make functions as adjusting voltages of the relays R1, R2, R3, R4, R5, R6, R7, and R8 and the SCR S1, S2, S3, and S4.

In at least one embodiment, the SCR S1 and S2 can promote a transmission time from the first input terminal 11 to the output terminal 15. The SCR S3 and S4 can promote a transmission time from the second input terminal 12 to the output terminal 15. Each of the SCR can reduce a voltage drop of the corresponding relay coupled in parallel. Therefore, arc discharge generated by the relays R2, R4, R6, R8 can be reduced.

In use, when the output terminal 15 receives a first input voltage from the first input terminal 11, the first voltage sensor 2301 senses the first input voltage, and transmits the first input voltage to the processor 25. The first zero crossover signal sensor 2310 senses a zero crossover signal of the first input voltage, and transmits the zero crossover signal of the first input voltage to the processor 25. The processor 25 detects a period T of the first input voltage through the first voltage sensor 2301, and determines whether the first input voltage is normal or not. If the first input voltage is abnormal, the processor 25 computes a delay time $T_{Delay}$ according to the period T of the first input voltage and a discharge time $T_{Release}$ of each relay of the first switch unit 13, and determines when to output a control signal to disconnect the relays R1, R2, R3, R4 of the first switch unit 13 according to the delay time $T_{Delay}$ and the zero crossover signal of the first input voltage. Each relay usually includes a coil and a plurality of contacts. In at least one embodiment, the discharge time $T_{Release}$ is a period started from the coil of one relay receiving a disconnect signal until the contacts of the relay disconnecting, and the delay time $T_{Delay}$ is a period between the processor 25 detects the zero crossover signal (ZCD) of the first input voltage and outputs control signal to the relays, to make the relays to disconnect.

Figure 4:
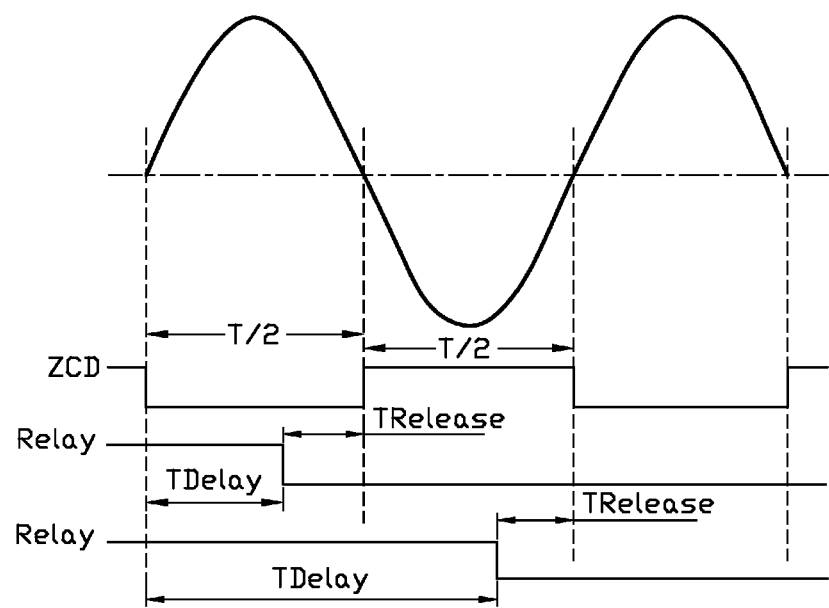
FIG. 4 is a waveform schematic diagram of the input voltage relating to a first zero crossover signal of the input voltage, which to determine a delay time of the relay of the first embodiment of the switch control device of FIG. 1.
Figure 5:
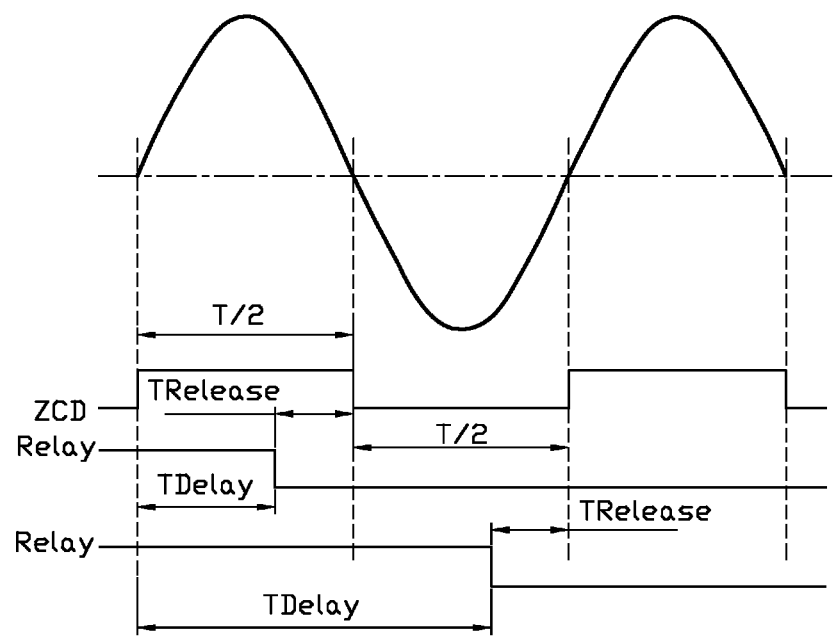
FIG. 5 is a waveform schematic diagram of the input voltage relating to a second zero crossover signal of the input voltage, which to determine a time of the relay of the first embodiment of the switch control device of FIG. 1.
Figure 6:
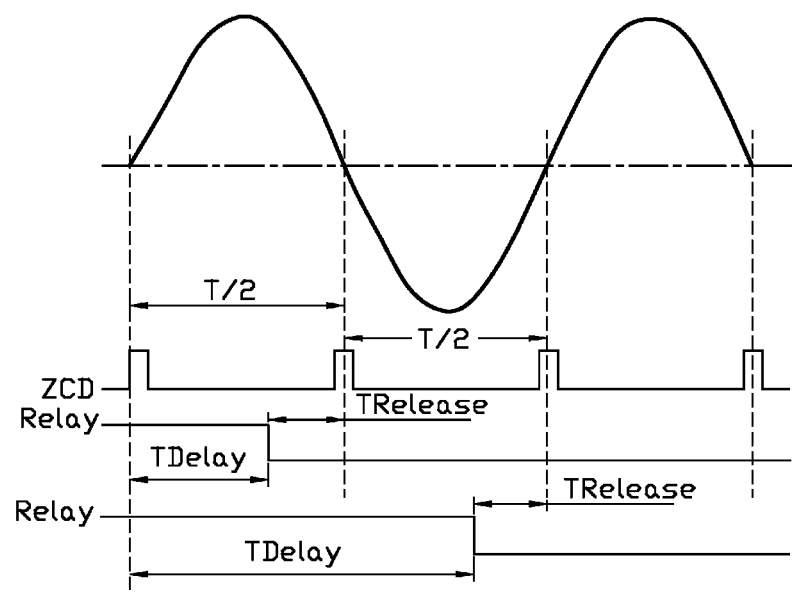
FIG. 6 is a waveform schematic diagram of the input voltage relating to a third zero crossover signal of the input voltage, which to determine a time of the relay of the first embodiment of the switch control device of FIG. 1.

FIGS. 4 to 6 illustrates waveform schematic diagrams of the first input voltage relating to three forms of zero crossover signal (ZCD) of the first input voltage, which make the processor 25 to determine when to output the delay time $T_{Delay}$ of each relay (Delay) of the first switch unit 13. In at least one embodiment, a relationship between the $T_{Delay}$ and the $T_{Release}$ as formula: $T/4-T_{Release}<T_{Delay}<T/2-T_{Release}$, or $3T/4-T_{Release}<T_{Delay}<T-T_{Release}$.

Therefore, the processor 25 detects the zero crossover signal (ZCD) of the first input voltage and outputs the control signal to the relays R1-R4 of the first switch unit 13 after the delay time $T_{Delay}$. When the contacts of the relays R1-R4 of the first switch unit 13 coupled to the first input terminal 11 turn off, the processor 25 controls the contacts of the relays R5-R8 of the second switch unit 14 coupled to the second input terminal 12 to turn on, to make the second input voltage from the second source S2 to be transmitted to the output terminal 15 through the relays R5-R8. In at least one embodiment, the zero crossover signal of the first input voltage is a signal of the sinusoidal wave of the first input voltage approach to an abscissa axis.

Figure 7:
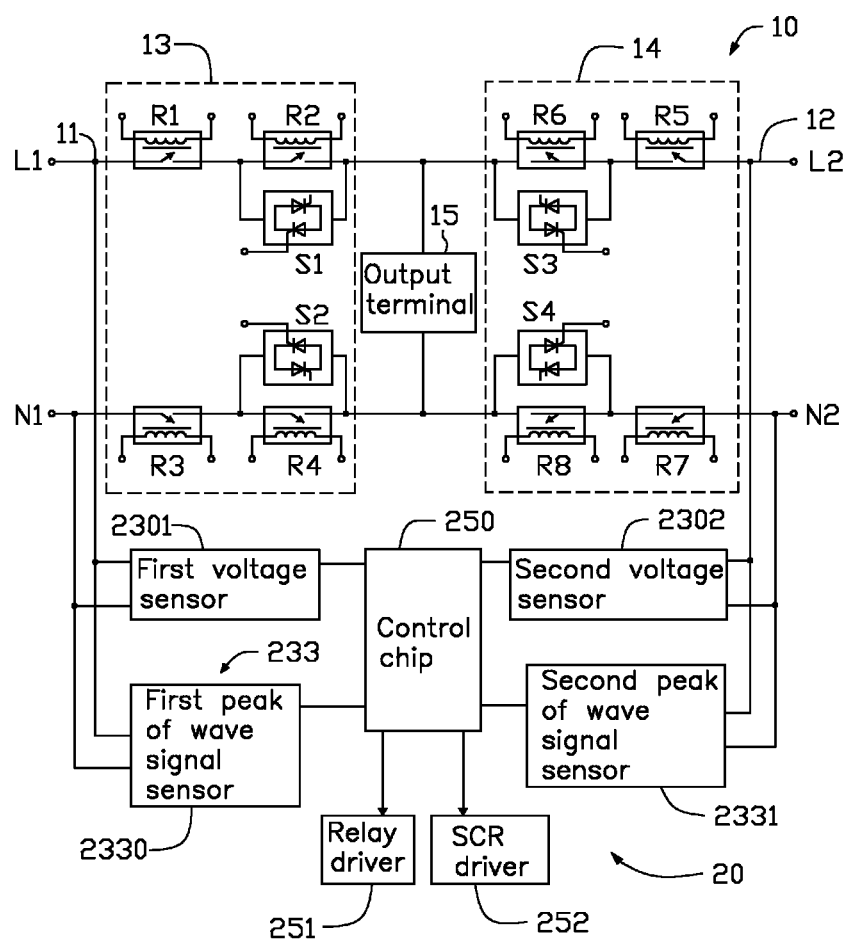
FIG. 7 is a schematic diagram of a second embodiment of the switch control device.

FIG. 7 illustrates a schematic diagram of a second embodiment of the switch control device 100. Difference from the first embodiment of the switch control device 100 is that, the detection unit 23 includes the voltage sensor 230 and a peak of wave signal sensor 233. The peak of wave signal sensor 233 includes a first peak of wave signal sensor 2330 and a second peak of wave signal sensor 2331. The first peak of wave signal sensor 2330 and the second peak of wave signal sensor 2331 are configured to receive the first input voltage and the second input voltage respectively, and detects peak of wave signal of the first or second input voltage, to transmit the peak of wave signal of the first or second input voltage to the processor 25.

In at least one embodiment, operation principle of the switch control device 100 in the first embodiment is similar as that of the second embodiment. When the output terminal 15 receives a first input voltage from the first input terminal currently, the first voltage sensor 2301 detects the first input voltage from the first input terminal 11, and transmits the first voltage to the processor 25. The first peak of wave signal sensor 2330 detects the peak of wave signal of the first input voltage, and outputs the peak of wave signal to the processor 25. The processor 25 detects the period T of the first input voltage through the first voltage sensor 2301, and determines whether the first input voltage is normal or not. If the first input voltage is abnormal, the processor 25 computes a delay time $T_{Delay}$ according to the period T of the first input voltage and the $T_{Release}$ of each relay of the first switch unit 13, and determines when to output a control signal to disconnect the relays R1, R2, R3, R4 of the first switch unit 13 according to the delay time $T_{Delay}$ and the peak of wave signal of the first input voltage.

Figure 8:
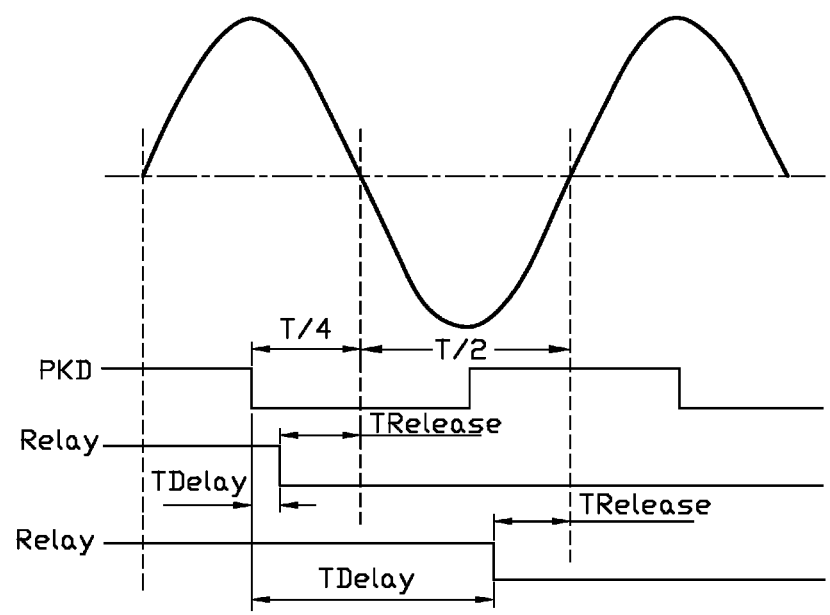
FIG. 8 is a waveform schematic diagram of the input voltage relating to a first peak of wave signal of the input voltage, which to determine a delay time of the relay of the second embodiment of the switch control device of FIG. 7.
Figure 9:
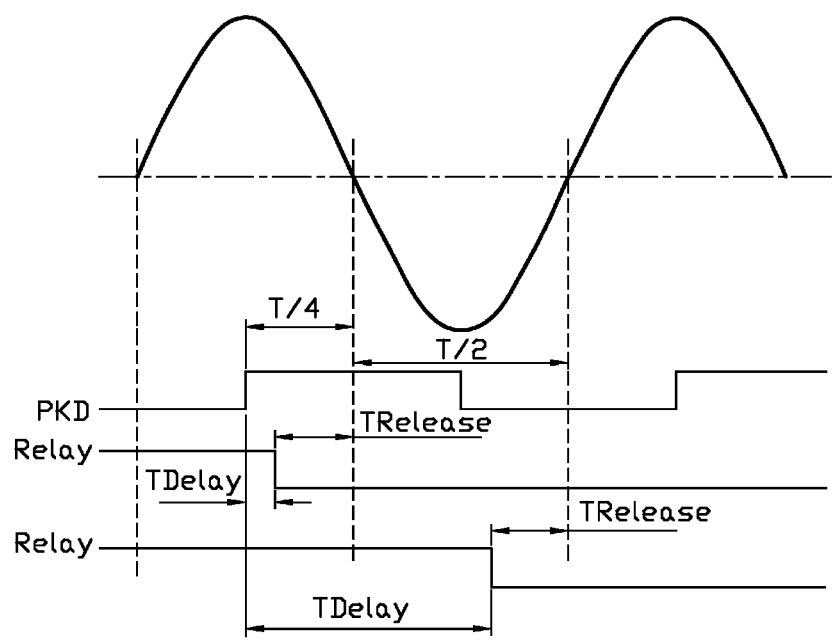
FIG. 9 is a waveform schematic diagram of the input voltage relating to a first peak of wave signal of the input voltage, which to determine a delay time of the relay of the second embodiment of the switch control device of FIG. 7.
Figure 10:
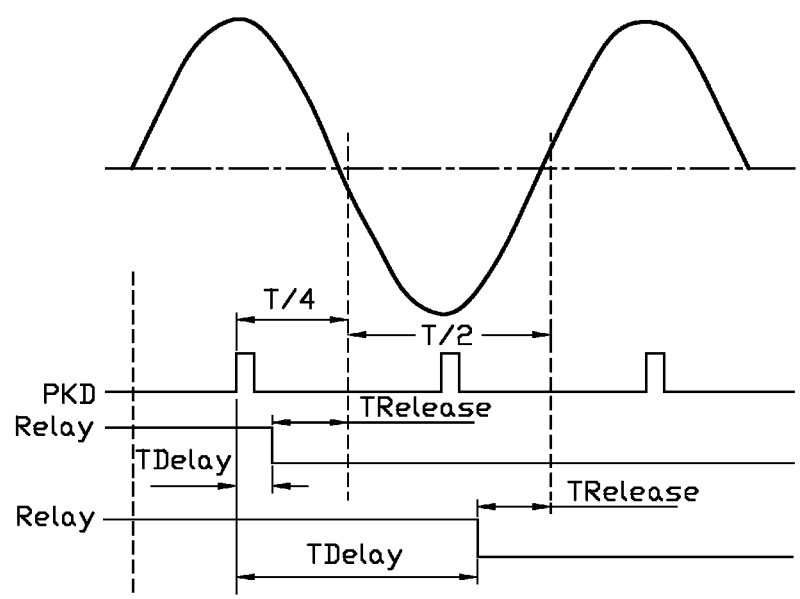
FIG. 10 is a waveform schematic diagram of the input voltage relating to a first peak of wave signal of the input voltage, which to determine a delay time of the relay of the second embodiment of the switch control device of FIG. 7.

FIGS. 8 to 10 illustrates waveform schematic diagrams of the first input voltage relating to three forms of peak of wave signal (PKD) of the first input voltage, which make the processor 25 to determine when to output the delay time $T_{Delay}$ of each relay (Delay) of the first switch unit 13. In at least one embodiment, a relationship between the $T_{Delay}$ and the $T_{Release}$ as formula: $0<T_{Delay}<T/4-T_{Release}$, or $T/2-T_{Release}<T_{Delay}<3T/4-T_{Release}$.

Therefore, the processor 25 detects the peak of wave signal (PKD) of the first input voltage and outputs the control signal to the relays R1-R4 of the first switch unit 13 after the delay time $T_{Delay}$. When the contacts of the relays R1-R4 of the first switch unit 13 coupled to the first input terminal 11 turn off, the processor 25 controls the contacts of the relays R5-R8 of the second switch unit 14 coupled to the second input terminal 12 to turn on, to make the second input voltage from the second source S2 to be transmitted to the output terminal 15 through the relays R5-R8. Therefore, an arc discharge resulted by the relays can be avoid or reduce.

Figure 11:
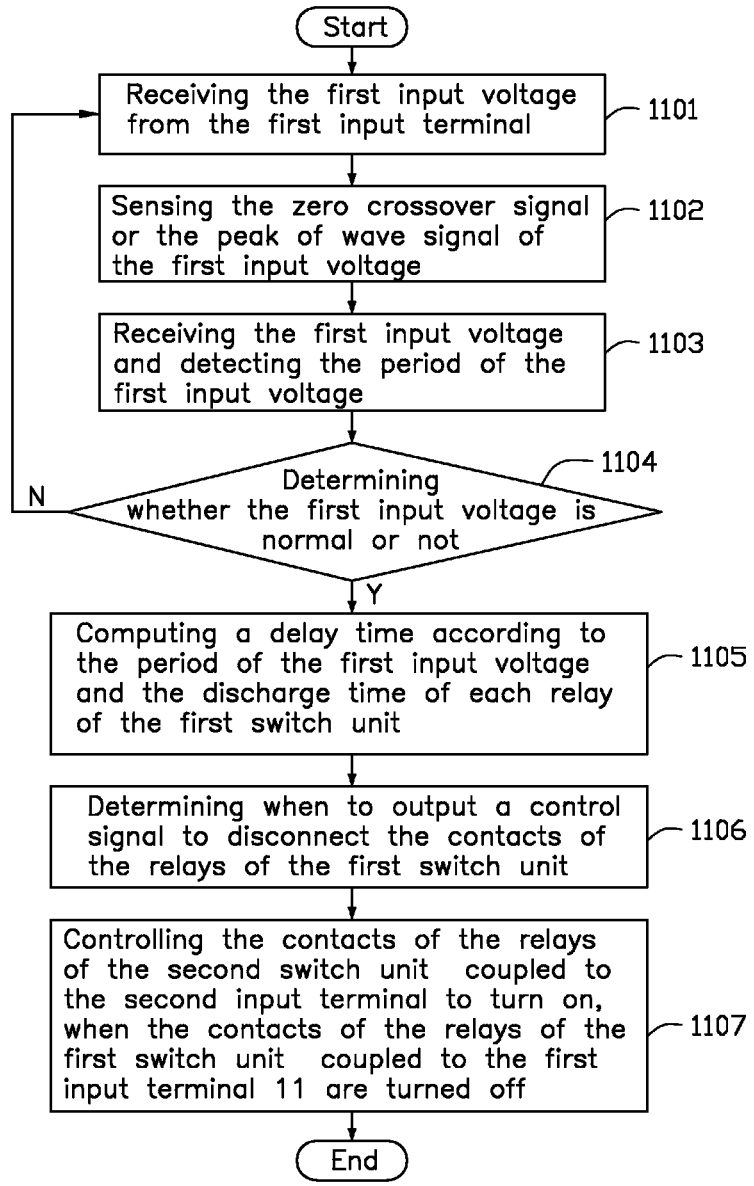
FIG. 11 is a flow chart diagram of the switch control device.

Referring to FIG. 11, a flowchart is presented in accordance with an example embodiment of a switch control device 100 which is being thus illustrated. The example method is provided by way of example, as there are a variety of ways to carry out the method. The method described below can be carried out using the configurations illustrated in FIGS. 1, 2,3, and 7. The exemplary method can be executed by an switch control device 100, and can begin at block 1101.

At block 1101, the voltage sensor 230 receives the first input voltage from the first input terminal.

At block 1102, a sensor, such as the zero crossover signal sensor 231 or the peak of wave signal sensor 233 senses the zero crossover signal or the peak of wave signal of the first input voltage.

At block 1103, the processor 25 receives the first input voltage from the voltage sensor 230, and detects the period T of the first input voltage.

At block 1104, the processor 25 determined whether the first input voltage is normal or not, If the first input voltage is abnormal, the process goes to block 1105, otherwise, the process goes to block 1101.

At block 1105, the processor 25 computes a delay time $T_{Delay}$ according to the period T of the first input voltage and the discharge time $T_{Release}$ of each relay of the first switch unit 13.

At block 1106, the processor 25 determines when to output a control signal to disconnect the contacts of the relays of the first switch unit 13 according to the delay time $T_{Delay}$ and the zero crossover or peak of wave signal of the first input voltage.

At block 1107, when the contacts of the relays of the first switch unit 13 coupled to the first input terminal 11 are turned off, the processor 25 controls the contacts of the relays of the second switch unit 14 coupled to the second input terminal 12 to turn on, to make the second input voltage from the second source S2 to be transmitted to the output terminal 15 through the second switch unit 14.

When the second input terminal 12 transmits the second input voltage from the second source S2 to the output terminal 15 through the second switch unit 14, and the second voltage sensor 2302 operates, the principle is similar to the first input terminal 11 transmits the first input voltage from the first source S1 to the output terminal 15 through the first switch unit 13, and the first voltage sensor 2301 operates.

While the disclosure has been described by way of example and in terms of the embodiment, it is to be understood that the disclosure is not limited thereto. On the contrary, it is intended to cover various modifications and similar arrangements as would be apparent to those skilled in the art. Therefore, the range of the appended claims should be accorded the broadest interpretation so as to encompass all such modifications and similar arrangements.

What is claimed is:

1. A switch control device comprising:
   a switch device comprising a first input terminal, a second input terminal, a first switch unit, a second switch unit, and an output terminal receiving a first input voltage from the first input terminal through the first switch unit or a second input voltage from the second input terminal through the second switch unit, each of the first and second switch units comprising a plurality of relays;
   a control device comprising:
      a detection unit coupled to the first and second input terminal and configured to detect a zero crossover signal of the first input voltage or the second input voltage;
      a processor coupled to the detection unit, the first switch unit, and the second switch unit, wherein the processor is configured to:
         receive the first or second input voltage and the zero crossover signal of the first or second input voltage;
         detect a period of the first or second input voltage;
         determine whether the first or second input voltage is normal or not;
         when the first input voltage from the first input terminal is abnormal, compute a delay time according to the period of the first input voltage and a discharge time of relays of the first switch unit; and control the relays of the first switch unit to turn off according to the delay time and the zero crossover signal of the first zero crossover signal of the first input voltage; when the first switch unit is turned off, the processor controls the second switch unit coupled to the second input terminal to turn on;
   wherein each of the first and second switch units comprises first to fourth relays, a first silicon controlled rectifier (SCR), and second SCR; the first and second relays are coupled in series, and are coupled between a live wire of the first or second input terminal and the output terminal; the third and fourth relays are coupled in series, and are coupled between a neutral wire of the first or second input terminal and the output terminal; a first terminal of the first SCR is coupled to a node between the first relay and the second relay, a second terminal of the first SCR is coupled to the output terminal; a first terminal of the second SCR is coupled to a node between the third relay and the fourth relay, a second terminal of the second SCR is coupled to the output terminal; controls terminal of the first and second SCRs are coupled to the processor.

2. The switch control device of claim 1, wherein the detection unit comprises a voltage sensor and a zero crossover signal sensor, both of the voltage sensor and the zero crossover signal sensor are coupled to the first input terminal, the second input terminal, and the processor, the voltage sensor is configured to receive the first or second input voltage, and to transmit the first or second input voltage to the processor.

3. The switch control device of claim 2, wherein the zero crossover signal sensor comprises a first zero crossover signal sensor and a second zero crossover signal sensor, the first zero crossover signal sensor and the second zero crossover signal sensor are coupled to the first input terminal and the second input terminal respectively, the processor is configured to detect the zero crossover signal of the first input voltage through the first zero crossover signal sensor, or to detect the zero crossover signal of the second input voltage through the second zero crossover signal sensor.

4. The switch control device of claim 3, wherein the voltage sensor comprises a first voltage sensor and a second voltage sensor, the first voltage sensor and the second voltage sensor are coupled to the first input terminal and the second input terminal respectively, the processor is configured to detect whether the period of the first input voltage is normal or not through the first voltage sensor, or to detect whether the period of the second input voltage is normal or not through the second voltage sensor.

5. The switch control device of claim 1, wherein each of the relays is coupled to the processor.

6. A switch control device comprising:
a switch device comprising a first input terminal, a second input terminal, a first switch unit, a second switch unit, and an output terminal receiving a first input voltage from the first input terminal through the first switch unit or a second input voltage from the second input terminal through the second switch unit, each of the first and second switch units comprising a plurality of relays;
a control device comprising:
a detection unit coupled to the first and second input terminal, and configured to detect a peak of wave signal of the first input voltage or the second input voltage;
a processor coupled to the detection unit, the first switch unit, and the second switch unit, wherein the processor is configured to:
receive the first or second input voltage and the peak of wave signal of the first or second input voltage;
detect a period of the first or second input voltage;
determine whether the first or second input voltage is normal or not;
when the first input terminal from the first input terminal is abnormal, computes a delay time according to the period of the first input voltage and a discharge time of relays of the first switch unit, and controls the relays of the first switch unit to turn off according to the delay time and the peak of wave signal of the first zero crossover signal of the first, when the first switch unit is turned off, the processor controls the second switch unit coupled to the second input terminal to turn on;
wherein each of the first and second switch units comprises first to fourth relays, a first silicon controlled rectifier (SCR), and second SCR; the first and second relays are coupled in series, and are coupled between a live wire of the first or second input terminal and the output terminal; the third and fourth relays are coupled in series, and are coupled between a neutral wire of the first or second input terminal and the output terminal; a first terminal of the first SCR is coupled to a node between the first relay and the second relay, a second terminal of the first SCR is coupled to the output terminal; a first terminal of the second SCR is coupled to a node between the third relay and the fourth relay, a second terminal of the second SCR is coupled to the output terminal; controls terminal of the first and second SCRs are coupled to the processor.

7. The switch control device of claim 6, wherein the detection unit comprises a voltage sensor and a zero crossover signal sensor, both of the voltage sensor and the zero crossover signal sensor are coupled to the first input terminal, the second input terminal, and the processor, the voltage sensor is configured to receive the first or second input voltage, and to transmit the first or second input voltage to the processor.

8. The switch control device of claim 7, wherein the peak of wave signal sensor comprises a first peak of wave signal sensor and a second peak of wave signal sensor, the first peak of wave signal sensor and the second peak of wave signal sensor are coupled to the first input terminal and the second input terminal respectively, the processor is configured to detect the peak of wave signal of the first input voltage through the first peak of wave signal sensor, or to detect the peak of wave signal of the second input voltage through the second peak of wave signal sensor.

9. The switch control device of claim 8, wherein the voltage sensor comprises a first voltage sensor and a second voltage sensor, the first voltage sensor and the second voltage sensor are coupled to the first input terminal and the second input terminal respectively, the processor is configured to detect whether the period of the first input voltage is normal or not through the first voltage sensor, or to detect whether the period of the second input voltage is normal or not through the second voltage sensor.

10. The switch control device of claim 6, wherein each of the relays is coupled to the processor.

11. A control method of a switch control device comprising:
a voltage sensor receiving a first input voltage from a first input terminal;
a signal sensor sensing a zero crossover signal or the peak of wave signal of the first input voltage;
a processor receiving the first input voltage and detecting the period of the first input voltage, and determining whether the first input voltage is normal or not, the processor computing a delay time according to the period of the first input voltage and a discharge time of relay of a first switch unit when the first input voltage is abnormal;
the processor determining when to output a control signal to turn off of the relays of the first switch unit, according to the delay time and the zero crossover signal or the peak of wave signal of the first input voltage;
when the first switch unit is turned off, the processor controlling the second switch unit coupled a second input terminal to turn on;
wherein the first switch unit comprises first to fourth relays, a first silicon controlled rectifier (SCR), and second SCR; the first and second relays are coupled in series, and are coupled between a live wire of the first or second input terminal and the output terminal; the third and fourth relays are coupled in series, and are coupled between a neutral wire of the first or second input terminal and the output terminal; a first terminal of the first SCR is coupled to a node between the first relay and the second relay, a second terminal of the first SCR is coupled to the output terminal; a first terminal of the second SCR is coupled to a node between the third relay and the fourth relay, a second terminal of the second SCR is coupled to the output terminal; controls terminal of the first and second SCRs are coupled to the processor.

* * * * *